Feb. 18, 1947.   P. M. CONTANT ET AL   2,415,936
IONIC EXCHANGE OPERATIONS
Filed Jan. 22, 1944   5 Sheets-Sheet 4

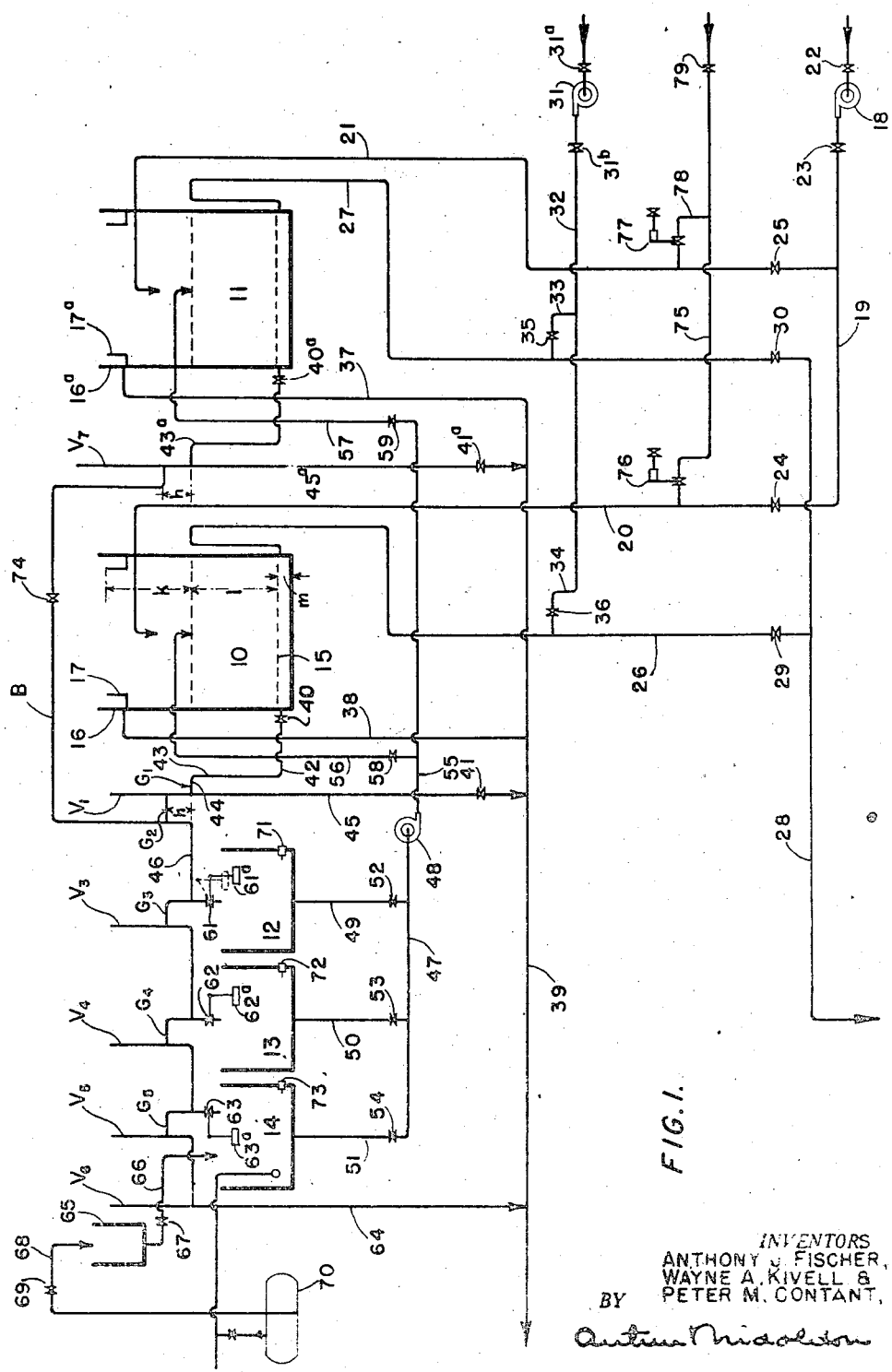

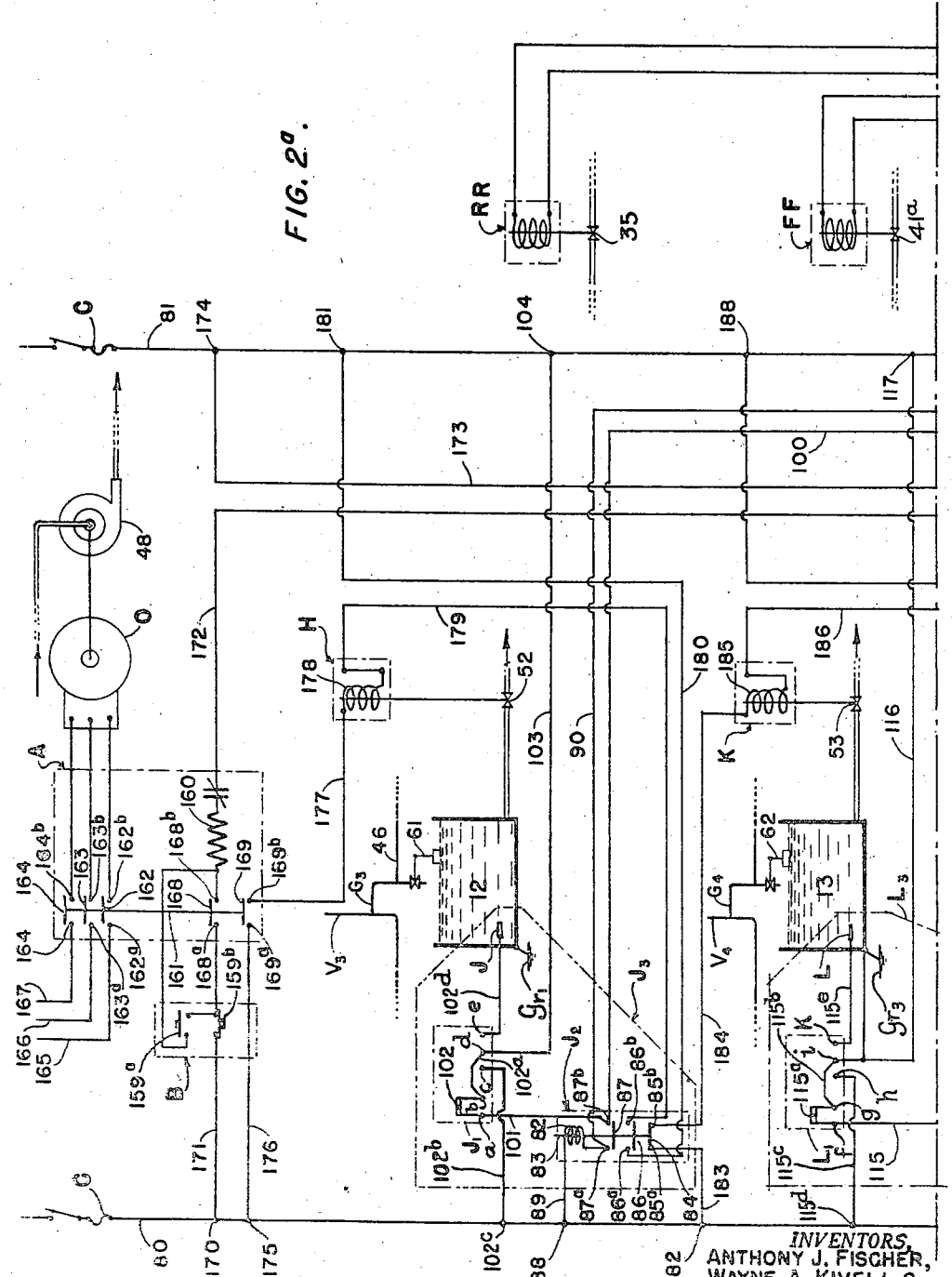

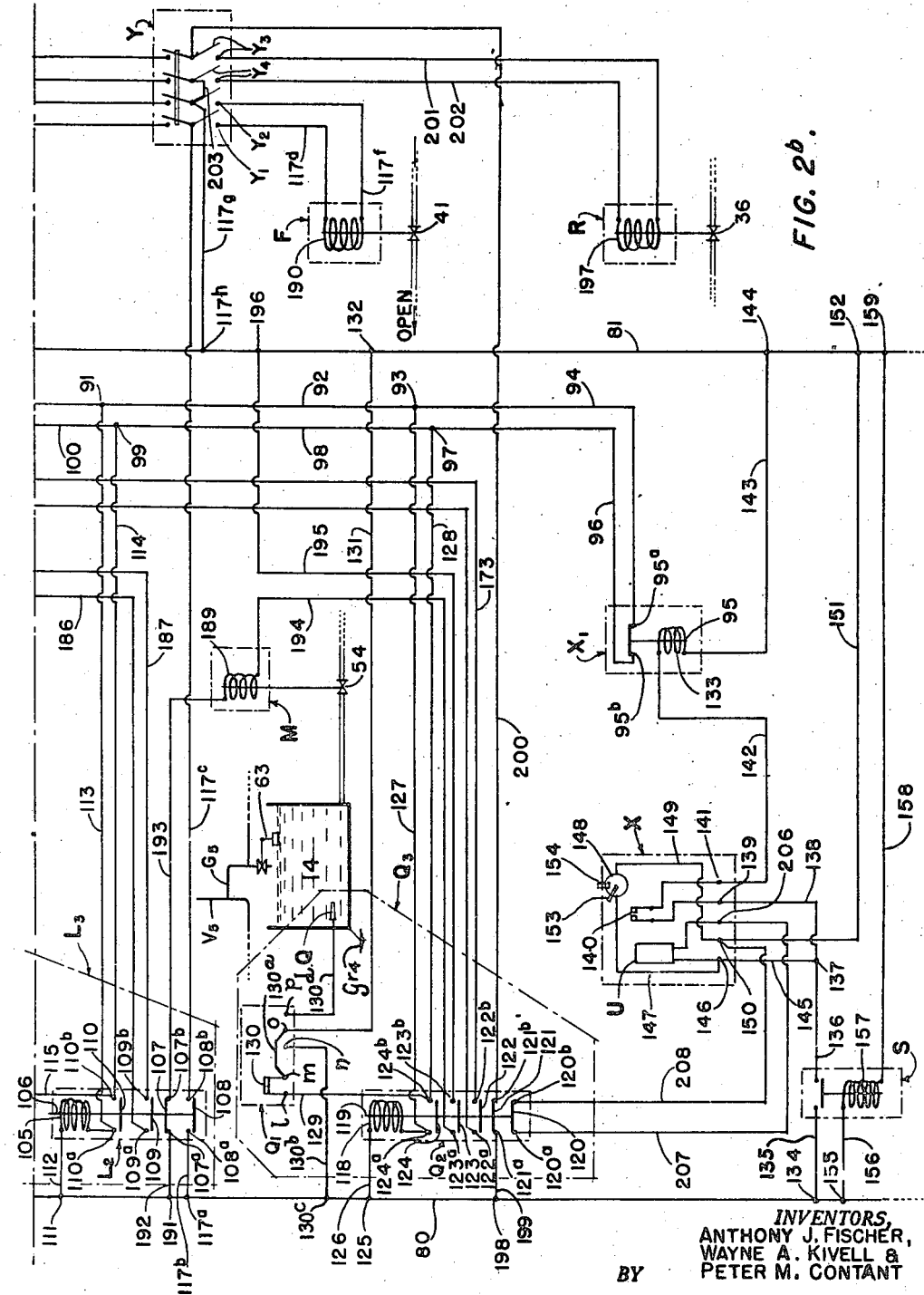

INVENTORS:
ANTHONY J. FISCHER,
WAYNE A. KIVELL &
PETER M. CONTANT,
BY

ATTORNEY

Feb. 18, 1947.　　P. M. CONTANT ET AL　　2,415,936
IONIC EXCHANGE OPERATIONS
Filed Jan. 22, 1944　　5 Sheets-Sheet 5
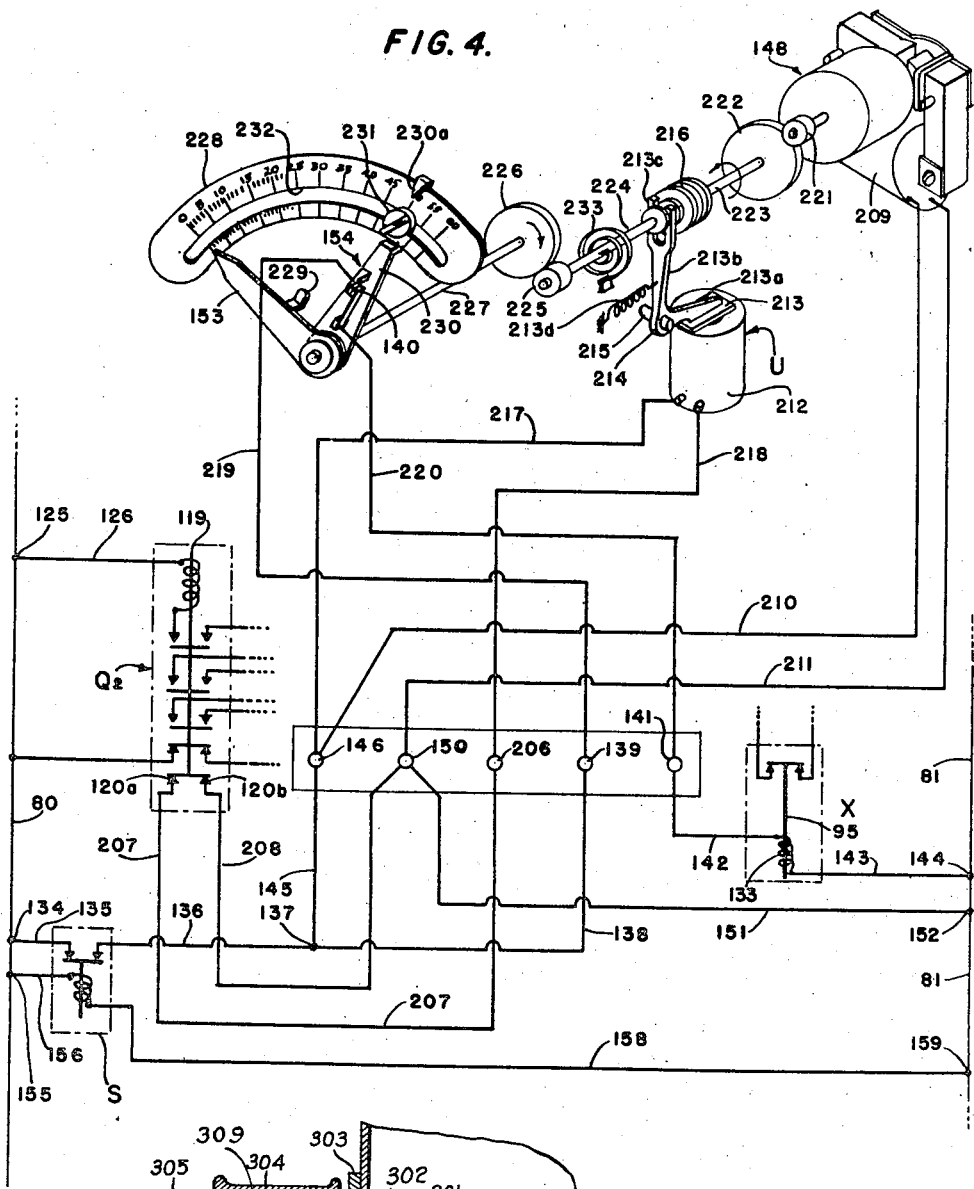
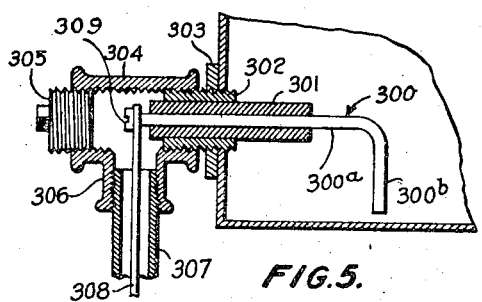
INVENTORS:
ANTHONY J. FISCHER,
WAYNE A. KIVELL &
PETER M. CONTANT,
BY
ATTORNEY Patented Feb. 18, 1947

2,415,936

UNITED STATES PATENT OFFICE 2,415,936

IONIC EXCHANGE OPERATIONS

Peter M. Contant, Maywood, N. J., and Anthony J. Fischer, Manhasset, and Wayne A. Kivell, Bronxville, N. Y., assignors to The Dorr Company, New York, N. Y., a corporation of Delaware Application January 22, 1944, Serial No. 519,386

14 Claims. (Cl. 210—24)

The invention relates to improvements in the operating system of ionic exchanger beds, and more specifically to improvements in the regeneration phase of the exchanger operating cycle; as well as to improved devices per se employed in the exchanger system.

One problem in regard to those improvements is to establish an automatically functioning regeneration cycle employing a counter-current principle or multi-stage system, such as will hereinafter be explained, because of the economy attainable through it; and this in turn involves the problem of providing automatic means for sequentially filling a number of tanks with liquid from a common source of feed.

Because of these two aspects involved, the invention may be said to have among its objects: (A) to provide improved means for conducting the regeneration in stagewise or counter-current fashion; that is to provide automatic means for effecting counter-current regeneration of an exchanger bed, whereby the bed is sequentially contacted with partly or nearly spent regenerant solution, and thereafter with less spent or nearly unspent or fresh regenerant solution, and finally contacted with rinse water to displace the last batch of solution sent into the exchanger bed; still otherwise expressed, to provide an automatic carry-over system whereby a number of solution tanks, and finally the rinse water supply, become sequentially connected with the exchanger bed in a manner to establish the desired cycle; and (B) to provide simple and foolproof means for sequentially feeding and filling a number of tanks in their order of sequence from a common feed header, whereby the feed is automatically carried over from one tank to the other.

Another object is to provide a counter-current regeneration system that is simple and yet fully automatic in the sense that, for instance, a push button impulse will start it.

Ionic exchanger materials, also simply called exchangers, are for practical purposes a granular material, and a solution to be treated by them is passed through a bed of that material, preferably so that the bed remains in submergence, allowing ionic exchange to take place between the exchanger material and the ionized solutes in the liquid. Such exchangers may be subdivided into the class of cation-exchangers and the class of anion-exchangers, and they may be employed, for instance, in the softening or chemical purification treatment of water, or in the purification treatment of sugar juices.

Among the exchanger materials there are known today two important groups, namely, the "zeolites" and the "organolites."

The zeolites are cation exchangers of inorganic nature and they have substantially little or no acid resistance, that is they are liable to disintegration and color throwing in a strong-acid environment. That is to say, they operate in a neutral cycle of exhaustion and regeneration, in that they are capable of performing a simple exchange of one kind of cation against another kind, for instance sodium against calcium. When exhausted by saturation with Ca-ions, they can be regenerated with a neutral salt in solution, such as NaCl.

This cycle comprises contacting the exchanger material or bed with the solution to be treated containing Ca-ions, whereby the Ca-ions are taken up by the exchanger while in return the molar equivalent of Na is released from the exchanger into the solution.

The organolites derive their name from the fact that (in distinction from the inorganic zeolites) they are of organic nature, and as now known they are represented by synthetic resinous compounds. They can be classed as cation exchangers on the one hand, and anion exchangers on the other hand, and they are and must be non-disintegrating in the presence of strong-acid solution, and the anion exchanger must be resistant to a strong-alkali solution as well. The reasons for this, and the importance and function of the cation- and the anion exchanging qualities respectively of these organolites will appear more fully hereinafter. Cation- and anion exchangers other than the organolites are also known.

Aside from being capable of merely exchanging one cation (for instance Na) for another kind of cation (such as Ca), the cation exchanging organolite is also capable of a specific exchange operation whereby cations are taken up from a solution by the exchanger, while the molar equivalent of H-ion is released from the exchanger into the solution, and whereby the solution is accordingly acidified. Because of this specific ability, the cation-exchanging organolite may also be called an H-ion exchanger, while the respective exchange operation may be called the H-ion exchange cycle.

Thus, for instance due to the presence of sulfates and chlorides in the solution being treated, sulfuric acid and hydrochloric acid are formed, as long as the solution is contacted with or passed through the H-ion exchanger bed, that is until the exchange capacity of the bed will have become exhausted. The exchanger bed in turn will become regenerated by contact with strong-acids of suitable concentration, for instance the same kind of strong-acids that are found to have been formed in the acidified effluent liquid passing from the bed.

The organolite exchanger of the anion-exchanging kind, since it is acid-resistant, is capable of functioning as a de-acidifier of solutions. That is to say, it is conditioned or saturated with OH-ions by regeneration with a strong-alkali solution. Then when the thus regenerated exchanger is contacted with an acidified solution containing sulfuric acid and/or hydrochloric acid, the OH-ions are released into the solution, while the molar equivalent of sulfate- or chloride anions is taken up by the exchanger until it becomes exhausted. This means that the exchange of anions in what may be called the hydroxyl (OH) cycle, will convert the acid into the molar equivalent of HOH, i. e., $H_2O$, i. e., pure water. It will be understood that the anion exchanger is also alkali-resistant, since it must be regenerated with a strong-alkali solution, for instance sodium carbonate ($Na_2CO_3$).

For the purpose of ionic purification treatment or de-salting of liquids, that is, the removal therefrom of ionized solutes or salts, the liquid can be subjected to the sequential treatment in a cation- and an anion exchanger bed, with the net result that the ionized solutes are replaced with the molar equivalent in pure water, as the liquid passes first through an acidification phase (in the H-ion cycle) and then through a de-acidification phase (in the OH-cycle).

By way of example the invention will herein be described in connection with the exchange cycle of an organolite, involving regeneration with an acid such as sulfuric acid, and operation in counter-current fashion whereby a relatively high economy is attainable with respect to the quantity of the relatively expensive acid used.

Counter-current regeneration operation such as contemplated for the purpose of the invention involves passing through the exchanger bed first partially used regenerant solution from a previous cycle, and subsequently less spent and/or full strength or fresh solution. Hence there is provided a series of tanks containing the respective batches of regenerant solutions, which tanks are required to be placed into action sequentially with respect to the exchanger bed in such a manner that, as each tank is emptied into the bed, the residual liquid in the bed is displaced by the contents of the next following tank. This may also involve the return of not fully spent solution into an emptied tank, by way of displacement from the bed, for use in a subsequent cycle. It further involves displacing with wash water the final or largely unspent residual regenerant solution from the bed, for use in a following cycle. However, acid and wash water intermix to some extent, and most in the zone where they adjoin and contact each other directly. Hence, the tail end portion of the volume of acid being displaced from the bed, will appear to have become somewhat diluted, while a trailing acid portion is found in gradually diminishing strength in a volume of displacement water as it passes from the bed following the passing of the volume of acid. The largely unspent and slightly diluted displaced acid is re-used in a subsequent cycle as partially used solution. while the water containing the trailing acid portion may be utilized for the preparation of fresh regenerant solution of desired strength by adding the necessary amount of acid thereto.

The number of solution tanks or stages used as well as their particular manner of operation may be varied within the scope of this invention. However, considering as an example a three tank arrangement, in which the first tank contains nearly spent but not fully utilized solution, the second tank more nearly unspent solution, and the third tank fresh unspent solution, the objects of the invention are attainable by way of an automatic carry-over system as follows:

The emptying of the first tank into the exchanger bed establishes connections enabling the second tank to feed its content into the exchanger bed, thereby displacing residual solution left in the bed from the first tank, sending it to waste as fully spent solution. This condition continues until the second tank is empty.

The emptying of the second tank into the exchanger bed establishes connections which enable the third tank to feed its content of fresh strong solution into the bed thereby displacing nearly spent residual solutions left in the bed from the second tank into the first tank.

The emptying of the third tank establishes connections whereby displacement or rinse water is sent into the exchanger bed, and whereby residual partially spent or nearly unspent solution is displaced from the bed into the second tank for use in another regeneration cycle. This continues until the second tank is full, at which time the bed will have in it residual displacement water containing trailing acid.

The filling or full condition of the second tank establishes a connection whereby the continued flow of wash water into the bed will displace the water containing trailing acid from the bed into the first tank, to serve as make-up water to which the appropriate amount of strong-acid is added to make fresh solution of the desired strength.

More specifically it may be said that the objects of this invention are attained by connecting the inlet valves of the solution tanks to a common header or acid return line leading from the exchanger bed, and by connecting the outlet valves of the tanks to a common header leading to the exchanger bed, and providing a carry-over system controlled by the solution levels in the tanks, and effective to open or block the passages to and from the tanks, as well as to open or block the wash water supply, all in a sequence and coordination to establish the counter-current operation just outlined.

Still further particularized, the carry-over between the inlet passages or inlet valves for the solution tanks is effected through blockage means which open automatically due to hydraulic pressure and which are provided at intervals in the feed header, each inlet valve having one such blockage means associated therewith. A blockage is opened as a result of the pressure of the solution or liquid being displaced from the exchanger bed, whenever the associated tank inlet valve closes. That is to say, when the inlet valve of a solution tank closes due to the rise of the liquid level in the tank as it fills up with the solution displaced from the bed, such closing of the inlet valve will cause pressure in the header to build up sufficiently to open the blockage, thus opening the next section of the header and affording access to the next tank. Thus the solution will flow through the header past the closed tank inlet valve or branch connection to the next blockage where another branch connection admits it through a then open valve into the next tank.

The carry-over between the outlet valves of the solution tanks is effected in such a manner that the empty condition of one tank will close the outlet valve of that tank and open the outlet valve of the tank next in order.

The operation of the carry-over system is rendered automatic with the aid of solenoid-actuated valves controlled by liquid levels in the solution tanks.

Some features of the invention reside in certain combinations of liquid-level-controlled inlet and outlet valves for the solution tanks, whereby an upper level effects the carry-over from the inlet valve of one tank to the inlet valve of the next tank, while a lower level effects the carry-over from the outlet valve of one tank to the outlet valve of the next tank.

Other features reside in the carry-over means for the inlet valves of the solution tanks, which comprise a flow-blockage means in the supply header; the blockage means becomes alternately effective and ineffective as an associated tank inlet valve opens and closes. In this way the supply flow is automatically diverted from one tank to the next.

Other automatic features of the carry-over system comprise: automatic operation of the rinse water supply for clearing the bed of the last batch of solution; automatically diverting the effluent solution passing from the bed from a path of waste disposal of spent solution into a path of returning to a previously emptied solution tank; automatically restoring the waste disposal connection with the effluent end of the bed prior to starting a new regeneration cycle; and automatically opening the outlet valve of the first solution tank at the beginning of the cycle, coincident with starting a pump to furnish the first batch of solution to the bed.

Still other features are embodied in specific devices employed in the carry-over system, namely the combination of a tank inlet valve with a blockage means in the feed header, which blockage means is yieldable to pressure building up in the initial portion of the header when the inlet valve closes.

The features more specifically defined comprise:

(a) An arrangement in which the solution tanks are operated by a combination of float control and electrical means which close the supply valve when the tank is filled to its upper limit, but leave the valve open while the level remains below that limit while filling or emptying; and in which the lower limit level or empty condition of the tank causes closure of the outlet valve of the tank together with the opening of the outlet valve of the full tank next in order.

(b) An arrangement in which the supply valve for each solution tank is cooperatively associated with a blockage means provided in the supply header. The blockage is effective as such while the associated supply valve is open, but becomes ineffective due to pressure building up in the header when the valve closes, allowing the flow in the header to proceed past the branch inlet just closed to the open inlet of the next tank.

(c) An arrangement in which the same impulse that starts a pump to furnish solution to the bed at the beginning of the cycle also opens through solenoid action the outlet valve of first solution tank.

(d) An arrangement in which the emptying of the last or fresh solution tank sends an impulse which stops the pump supplying the bed and header with solution, and which also starts the rinse water flow through the bed, as by solenoid action. The water supply valve is either time- or volume-controlled. A predetermined rinse water volume thus passing is large enough to sequentially displace from the bed the last batch of solution largely unspent, and in addition a batch of water containing the trailing acid, both batches being sent to the proper solution tanks in their order of sequence, for use in the next regeneration cycle.

(e) An arrangement in which the empty condition of the first solution tank sends an impulse to close the spent solution disposal outlet, while opening a blockage between the disposal outlet connection and the feed header for the tanks, so as to divert nearly spent effluent solution from the bed into the first solution tank for use in the next regeneration cycle.

(f) An arrangement comprising the foregoing automatic features of the carry-over system, with the addition that coincident with the time- or volume-controlled stoppage of the water supply, there is effected a resetting of the waste disposal valve to its open condition as a preparatory move for the beginning of the next regeneration cycle. This renders the operation of the regeneration cycle full-automatic in the sense that it requires but an initial push button impulse to start the cycle, namely the impulse described under (c).

(g) In association with an inlet valve for one of the solution tanks, an automatic blockage device in the form of a vented rising loop portion or "goose neck" formed by the feed header. While the inlet valve is open, the solution or liquid will take the path of least resistance, namely through the valve into the tank. When the valve closes, as the supply of liquid continues sufficient pressure will thereby build up to overcome the hydraulic head presented by the rising portion of the header, thus rendering the blockage ineffective and diverting the solution or liquid into another section of the header.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to us, but such embodiment is to be regarded as typical only of many possible embodiments, and the invention is not to be limited thereto.

The novel features considered characteristic of this invention are set forth with particularity in the appended claims. The invention itself, however, both as to its organization and its method of operation, together with additional objects and advantages thereof, will best be understood from the following description of a specific embodiment when read in connection with the accompanying drawings in which Figure 1 is a schematic showing of a three-stage countercurrent regeneration system connectible in alternation to one or the other of a pair of H-ion exchanger beds, with trailing acid recovery.

Figures 2a and 2b each show a part of an electric wiring diagram underlying the automatic operation of the carry-over system.

Figure 4 is an enlarged showing of a time-controlled switch device controlling the period of rinse water flow.

Figure 5 is an enlarged detail showing of one of the electrode fittings associated with the respective solution tanks.

Figure 3:
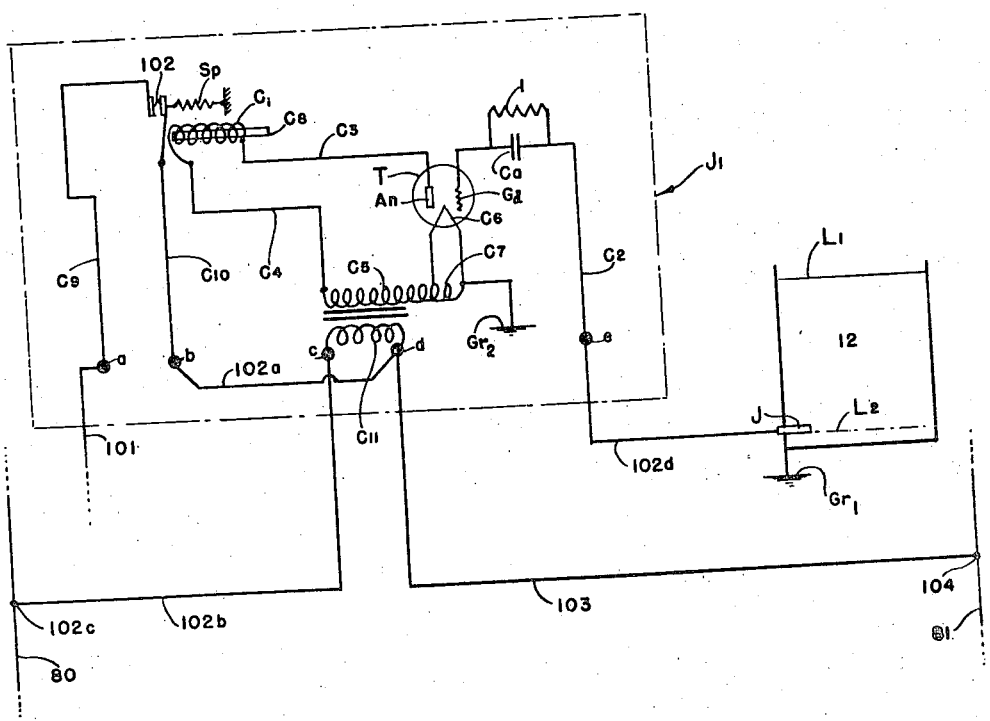
Figure 3 is an enlarged detail showing to exemplify electronic liquid level controlled devices associated with the respective solution tanks.

The apparatus system herein shown by way of example (see (Fig. 1) provides for three-stage regeneration whereby one of two exchanger beds 10 and 11, when exhausted, may be operatively connected to a system of three solution tanks 12, 13, 14. Each of the exchanger beds having a depth $l$ is shown to be supported upon a perforated plate 15 in a tank 16 provided with an overflow launder 17 a considerable distance above the top of the exchanger bed proper. The freeboard space $k$ between the top of the bed and the overflow edge of the launder 17 allows for throwing the granules of the bed into suspension or teeter by upflow passage of water therethrough. A space $m$ between the perforated plate 15 and the bottom of the tank 16 permits the withdrawal therefrom of liquid passing downward through the bed.

A complete operatiing cycle of the exchangers may comprise the (1) saturation or treatment phase during which the exchanger bed becomes gradually exhausted by the solution under treatment herein called the primary solution or liquid or raw water passing therethrough, (2) a teeter phase in which the granules or particles of the exhausted bed are thrown into suspension or teeter by an upflow of water for cleansing purposes, followed by drainage of excess water to cause subsiding of the bed, (3) the counter-current regeneration phase whereby a sequence of batches of solution is passed through the bed, with return of some batch or batches for re-use in another cycle, as well as recovery of trailing regenerant acid. This phase (3) is the one herein shown as full-automatic (see Figs. 2a and 2b).

Pump- and piping connection for operating either one or the other of the beds 10 and 11 in the first phase (1) comprises a feed pump 18 for the solution to be treated, a feed header 19 leading from the pump, having feed connection 20 leading to the top of bed 10 and a feed connection 21 leading to the top of bed 11. Shut-off valves 22 and 23 are shown at the inlet and outlet of the pump 18, and additional shut-off valves 24 and 25 in the branch feed connections 20 and 21 respectively. Outlet connections 26 and 27 for treated solution or liquid lead from the bottom of the tanks containing the beds 10 and 11 respectively, and join in a common discharge line 28 for further disposal. The outlet connections 26 and 27 have shut-off valves 29 and 30 respectively.

The second operating phase (2) is realized through a pump 31 for teeter water, a header 32 leading from the pump, and having a branch connection 33 leading into the discharge connection 27, and another branch connection 34 leading into the discharge connection 26. The branch connections 33 and 34 have shut-off valves 35 and 36 respectively. Teeter water may be introduced into the bottom of the exchanger beds by closing the valves 29 and 30 and opening the valves 36 and 35. Teeter water may overflow into the launder 17 whence it may discharge into connections 37 or 38 respectively leading into a common discharge line 39.

For instance, the teeter bed 10 may be caused to subside from its expanded or teetering condition to normal or compacted condition by shutting off valve 36 and by opening valves 40 and 41 permitting excess water to drain from the bottom of the bed through a pipe 42 having a rising portion 43, a transverse portion 44, and a falling portion 45, leading into the drain connection 39. In this way the pipe 42 forms a gooseneck $G_1$ determining the resulting water level in the tank 16. The gooseneck $G_1$ has a vent pipe $V_1$ from which branches a pipe 46 at a point disposed a distance $h$ above the top of the gooseneck $G_1$, which pipe 46 forms part of the pipe system for the regeneration of the beds.

The pump and pipe connections and accessories for the third operating phase (3), that is, regeneration will now be described in connection with bed 10 since bed 11 can be regenerated from the tanks 12, 13, 14 by the same system and in the same manner by way of suitable parallel connections and shut-off valves. That is to say, while bed 10 is connected for regeneration, bed 11 may be connected for solution treatment or production.

A discharge header 47 leading into the suction end of a pump 48, has branch connections 49, 50, 51, with the respective solution tanks 12, 13, 14, the branch connections having shut-off valves 52, 53, 54. The pump 48 delivers into a header 55 having branch connections 56 and 57 leading to the top of the exchanger beds 10 and 11 respectively, and having respective shut-off valves 58 and 59. Water residual in the bed from the preceding teeter operation, and, subsequent to it, spent regenerant solution may be displaced and discharged from the bed downwardly through a drain connection already specified in connection with the teetering phase, namely the valve 40 and the gooseneck $G_1$ comprising the pipe 42, the rising section 43, the transverse section 44, and the falling section 45 leading through valve 41 into the drain pipe 38.

In order to divert effluent, that is partially spent regenerant solution from drainage, and to effect its delivery to the regenerant solution tanks, the drain connection or gooseneck $G_1$ is connected at its top with the solution return pipe 46.

This pipe 46 in turn forms a series of goosenecks $G_2$, $G_3$, $G_4$, $G_5$, the top of which are located a distance $h$ above the top of the gooseneck $G_1$. These goosenecks function as yieldable blockages in diverting the effluent solution in pipe 46 sequentially from drainage to the first, then from the first to the second, and then from the second to the third solution tank. That is to say, when the drainage valve 41 is closed, the nearly spent effluent regenerant solution from pipe 42 will rise above gooseneck $G_1$ and up through gooseneck $G_2$, but will be blocked by gooseneck $G_3$ if valve 61 is open permitting the solution to flow into tank 12. The floats act in such a manner as to hold the valves 61, 62, 63 open when the tanks are empty or not filled, but close them when the level rises due to filling of the tank. Therefore, as solution continues flowing through pipe 46 from the bed 10, the filling of the tank 12 will eventually cause the float 61a to close valve 61 whereupon the solution will be forced up through gooseneck $G_3$ and through open valve 62 while gooseneck $G_4$ acts as a blockage. Again, as tank 13 fills, the rising liquid level lifts float 62a causing valve 62 to close.

The continued flow through pipe 46 will force the solution up through gooseneck $G_4$ thus overcoming the blockage represented by the static head $h$ thereof. The solution then meets the blockage represented by gooseneck $G_5$ as the solution flows through valve 63 filling the tank 14. This eventually raises float 63a closing valve 63 and causing the liquid to be forced over the blockage or gooseneck $G_5$, the pipe 46 then leading into a discharge pipe 64 terminating in the common discharge pipe 39.

Vents $V_3$, $V_4$, $V_5$ are provided for the respective goosenecks $G_3$, $G_4$, $G_5$. An additional vent $V_6$ is shown at the end of pipe 46 where it leads into the drain pipe 64. A measuring tank for strong fresh makeup acid for each regeneration cycle is provided at 65, having discharge pipe 66 leading into the tank 14, and having a shut-off valve 67, and also having a supply pipe 68 with shut-off valve 69 leading from an acid supply pressure tank 70.

There are also provided contact electrode devices 71, 72, 73 at the bottom of the respective solution tanks 12, 13, 14, which electrode devices send electric impulses for the purpose of operating certain solenoid-controlled valves and pipe connections of the carry-over system in response to the lowering of the solution level, that is the "empty" condition of the tanks. The function of these contact electrode devices in the operation of the electrical part of the automatic carry-over system will be more clearly set forth further below.

Operation

Be it assumed that the exchanger bed 11 continues normal production or H-ion exchange operation as the liquid to be treated passed from the supply header 19 through branch pipe 21 and open valve 25 to the top of bed 11 and out at the bottom through outlet pipe 27 and open valve 30 into the treated liquid discharge line 28. Valves 35, 40a, 41a, 59 associated with bed 11 are closed at this time so as to keep it disconnected from the regeneration system.

It should be noted that a by-pass connection B leading from the upper portion of pipe 45a of tank 11 to the solution return line 46 is also closed at this time as by a valve 74. Note also that this by-pass line does not in reality run as shown over the tank 16 of bed 10, but rather at a horizontal elevation substantially equal to that of the top of gooseneck $G_2$.

The exchanger bed 10 is assumed to have been taken out of production by shutting valve 24 in the branch feed connection 20, and valve 29 in the outlet connection 26. Valve 36 is then opened and the pump 31 started to furnish backwash or teeter water to the bottom of bed 10 through branch 34 and open valve 36, while valves 40 and 58 connecting the bed 10 with the regeneration system proper still remain closed. The backwash water now rising through the bed throws the granules or particles thereof into suspension or teeter condition whereby they are cleansed of solid phase impurities or deposits, which impurities are thus flushed out and leave the tank 16 with the teeter water overflowing into the launder 17 and out through the pipe connection 38 into the common drain or discharge line 39. After the bed 10 has thus been sufficiently flushed, the backwash water supply is shut off by stopping the pump 31 and closing valve 36. The particles or granules of the bed are then allowed to subside as an excess of teeter water is allowed to drain off from the space M at the bottom of the tank, after valves 40 and 41 have been opened.

The bed will subside and the water level will fall so as to adjust itself to the height of the gooseneck $G_1$ at which the bed is kept in submergence. The bed 10 is now ready for countercurrent regeneration from the solution tanks 12, 13, 14. The operation will first be described in its various stages and effects disregarding the electrical control and wiring system involved, which system will be more fully described below.

A suitable switch device, for instance a push button starter may start the pump 48 to furnish regenerant solution from the respective solution tanks 12, 13, 14 to the bed 10 through the header 55, and the now open valve 58 of the branch 56 to the top of the bed. The starting of the pump 48 starts an automatic cycle, namely the operation of the carry-over system whereby countercurrent regeneration is effected.

The starting of the pump 48 at the same time effects the opening through solenoid actuation of the valve 52 so as to enable the pump to draw the solution from tank 12, while valves 53 and 54 of tanks 13 and 14 remain closed. Thus the solution (nearly spent solution) passes from tank 12 to the top of the bed 10, displacing downwardly residual teeter water therein through valve 40 and gooseneck $G_1$ and the open valve 41 into the drain pipe 39 for disposal. When the solution level in tank 12 falls to a point at or below the contact electrode device 71, the valve 52 is thereby closed while the valve 53 also by solenoid actuation is opened. Thus the pump 48 continues functioning by drawing solution (less fully spent or nearly unspent solution or medium strength acid) from tank 13 to the top of bed 10 through the branch 56, thus displacing now fully spent solution originally in tank 12 through valve 40 and the gooseneck $G_1$ and open valve 41 into the drain or discharge pipe 39 to waste.

When the solution level in tank 13 falls to a point at or below the contact electrode device 72, this device wil cause valve 53 to close, and, at the same time, valve 54 by solenoid actuation to open, while valve 41 also solenoid-actuated is caused to close. With this setting the pump 48 now draws fresh unspent solution of the proper strength from tank 14 to the top of bed 10, thereby displacing from the bed weak solution that is not fully spent. Since the valve 41 is now closed, this displaced solution is barred from reaching the waste discharge pipe 39, and is diverted into the solution return pipe 46, the pressure building up so as to overcome the height or blockage of gooseneck $G_2$ as represented by the additional height or column $h$.

The solution then being blocked by the next gooseneck $G_3$ is thus delivered into empty tank 12 through the valve 61 now open due to the lowered position of float $61^a$. When tank 12 is full, the rising of float $61^a$ will close valve 61 and thereby force any further solution being displaced from the bed into pipe 46 to overcome the blockage represented by gooseneck $G_3$ and pass on into tank 13. This filling of tank 13 starts when the liquid level in tank 14 (strong solution tank) has fallen to a point at the contact electrode device 73 which through solenoid actuation causes valve 54 to close, and the pump 48 to stop, but also causes the rinse water line 75 to open by opening the solenoid-actuated valve 76, while the valve 77 in branch 78 of that line remains closed. A main valve 79 in the rinse water line 75 of course remains open.

This allows rinse water, may be raw water or water, which has been exchange-treated or desalted to flow to the top of the bed 10 and to displace downwardly from the bed medium strength or nearly unspent solution through valve 40, through gooseneck $G_2$, past the now closed valve 61, and through gooseneck $G_3$, and the now open valve 62 into the empty tank 13, while the gooseneck $G_4$ functions as a blockage preventing the solution to pass beyond that point in the line 46. When tank 13 is full with what had been full strength solution in tank 14 but is now medium strength solution, the float $62^a$ will cause valve 62 to close, while rinse water through valve 76 continues to flow downwardly through the bed. Consequently there will now be displaced from the bed a batch of water containing residual unspent acid from the bed in great dilution, namely what was herein defined initially as trailing acid. Since valves 61 and 62 are closed this displaced rinse water will be forced to overcome the blockage presented by gooseneck $G_4$ and to pass on through the now open valve 63 into the empty tank 14, while gooseneck $G_5$ acts as a blockage. When tank 14 has thus been filled, the float 63ᵃ will have caused valve 63 to close, thus forcing the continued flow of rinse water displaced from the bed 10 to overcome the blockage presented by gooseneck $G_5$ by flowing therethrough and into the discharge pipe 64 and the drain 39 to waste.

A time clock device electrically and through solenoid action associated with the rinse water valve 76 (valve 77 has a similar timing device) functions so as to close the valve 76 after an adequate predetermined amount of rinse water has passed through bed 10, thus stopping the rinse water. This time clock or volumetric device at the end of the rinse period also opens through solenoid action the valve 41 thus resetting the same and preparing for the beginning of the next regeneration cycle. Valves 40 and 58 may then be manually closed, and the regenerated bed 10 is again ready for production. By this time the other bed 11 may have become exhausted and be in need of regeneration. To this end it may be disconnected from the raw water supply, and connected with the regeneration system as represented by the solution tanks 12, 13, 14, by setting the proper valves. Thereupon the regeneration cycle may be started to work automatically in the manner described.

There will now be described the operation of the regeneration system including the function of the electrical system (as shown in Figures 2a and 2b) whereby the regeneration is automatically effected.

The control units within the electrical system comprise:

O = Motor for regenerant solution pump 48.
C = Main line switch (double pole single throw fusible switch).
A = Magnetic starter switch with overload relays and normally open interlock.
B = Start-stop push button station, to start regeneration.
J }
L } = Electrode (probe) fittings (such as type H31 manufactured by Photoswitch Inc., Cambridge, Mass.) mounted in solution tanks 12, 13, and 14, respectively, and responsive to "empty" condition of the tanks.
Q }
J₁ }
L₁ } = Electronic level control units (such as type P15N manufactured by Photoswitch Inc., Cambridge, Mass.) actuated by the electrode fittings J, L, Q, respectively.
Q₁ }
F = Solenoid unit for actuating the effluent disposal valve 41.
H }
K } = Solenoid units for actuating the outlet valves 52, 53, 54, respectively of solution tanks 12, 13, 14, respectively.
M }
R = Solenoid unit for actuating the wash or teeter water supply valve 36.
J₂ = Relay switch with 1 normally closed, and 2 normally open contacts.
L₂ = Relay switch with 1 normally closed and 3 normally open contacts.
Q₂ = Relay switch with 2 normally closed and 3 normally open contacts.
S = Time delay relay switch with normally closed contacts, and 15 seconds delay closing.
X = Time switch (such as manufactured by General Electric Co., type TSA-10) with solenoid actuated timer clutch U, and normally closed main contact T, for shutting the wash water supply valve R through relay switch Q₂.
X₁ = Relay switch with 1 normally closed contact.
Y = Double pole double throw switch for connecting the regeneration system either with bed 10 or with bed 11.
FF = Solenoid unit for actuating the effluent disposal valve 41a for tank 11.
RR = Solenoid for actuating the wash or teeter water supply valve 35 for tank 11.

The electrode J with the electronic level control device $J_1$ and the relay switch $J_2$ together constitute in effect a control unit indicated by the dot-and-dash line surrounding them and collectively designated as $J_3$; similarly, the electrode L with electronic level control device $L_1$ and the relay switch $L_2$ are a control unit designated as $L_3$; while the electrode Q with the electronic level control device $Q_1$ and the relay switch $Q_2$ constitute a control unit $Q_3$.

Let it be assumed that the exchanger bed 11 is being operated for production, that is to say that raw water is being drawn by the pump 18 through open valve 22 and sent through open valves 23 and 25 by way of pipe 21 to the top of exchanger bed 11, to pass downwardly through the bed and out at the bottom by way of pipe 27 and open valve 30 into the discharge header 28 for treated water. During this operation of bed 11 the valves 35, 40a and 59 are closed.

The exchanger bed 10 can be operated for production in the same manner, being connected in parallel with the bed 11 to the raw water supply and the treated water discharge through suitably valved pipe connections. However, bed 10 shall now be assumed to be exhausted and in need of regeneration. It is, therefore, disconnected from the raw water feed line by closing valve 24, and from the treated water discharge line by closing valve 29. The previously closed valve 36 is then opened while valves 40 and 58 remain closed.

That is to say, wash or teeter water from a source such as pump 31 (its inlet and outlet valves 31a and 31b being open) is sent upflowing into and through the bed 10 at a rate whereby the granules or particles of the bed are more or less thrown into suspension or teeter sufficient to wash the same clean of and to flush away any solid matter or impurities that may have been caught in the bed during the preceding water treatment phase. Due to the valve settings previously established and with the proper rate of upflow, the teeter water, carrying the flushed out impurities but substantially none of the exchanger material, is caused to overflow into discharge launder 17 being sent to waste through pipe connection 38 and waste water line 39. After the bed has thus been sufficiently flushed and cleansed, the flow of teeter water is shut off by closing valve 36, and valves 40 and 41 are opened to allow excess water to drain from the bed 10, causing the exchanger material to subside while the water level adjusts itself to substantially the elevation of the top of the bed and of the gooseneck $G_1$, keeping the exchanger bed submerged.

Bed 10 is now ready for regeneration and is connected to the counter-current regeneration system comprising the solution tanks 12, 13, 14 while valve 41 remains open. From this point on the operation is substantially automatic as shown in the electrical system according to Figures 2a and 2b which should be viewed together with the piping layout shown in Figure 1.

The valve control circuit with the line switch C comprises a pair of main conductors 80 and 81. The closing of the line switch C at once energizes the solenoids of the relay switches $J_2$, $L_2$, $Q_2$ and thereby re-sets the multiple contact switch members thereof in preparation to the further sequential automatic functioning of these switches. That is to say, the solenoid 82 of relay $J_2$ is energized to lift the contact member 83 so that the normally closed contact portion 84 will open the normally closed contacts 85a and 85b while the other two normally open contact portions 86 and 87 close the respective contacts 86a, 86b and 87a, 87b. The relay $J_2$ is energized by a circuit starting at point 88 and comprising conductor 89 constituting the solenoid coil 82, contact point 87a, conductor 90, point 91, conductor 92, point 93, conductor 94, contact member 95 normally closed on contact points 95a and 95b of a relay holding switch $X_1$, conductor 96, point 97, conductor 98, point 99, conductor 100, contact point 87b, conductor 101, normally closed main contacts 102 of the electronic level control device $J_1$, an internal conductor 102a within the device $J_1$, and conductor 103 terminating in point 104 on main line.

The device $J_1$ is identified by its terminals $a$, $b$, $c$, $d$, and $e$. The terminals $b$ and $d$ are bridged by an internal conductor 102a. Terminals $a$ and $b$ are bridged by the normally closed contacts 102. Terminal $c$ has a connection 102b leading to point 102c on the main line 80. The terminal $d$ connects the internal conductor 102a with the external conductor 103. The terminal $e$ has a conductor 102d leading to the electrode J.

The manner in which the main contacts 102 in the device $J_1$ are influenced by the liquid level in tank 12 is the same as in the similar devices $L_1$ and $Q_1$ which are influenced by the liquid levels in tanks 13 and 14 respectively. The function of device $J_1$ will now be described per se in view of the detail showing in Fig. 3.

As long as the electrode J is submerged in the solution of tank 12 a circuit is maintained over electrode J and ground $Gr_1$ of the tank, energizing solenoid coil $C_1$ so as to keep contacts 102 closed. The energizing circuit comprises conductor $C_3$ leading from anode $An$ of tube T to solenoid coil $C_1$, conductor $C_4$, secondary transformer coil $C_5$, cathode filament $C_6$ which is in parallel with a portion $C_7$ of the secondary transformer coil. A grid circuit influencing the bias on grid $Gd$ of tube T comprises ground $Gr_1$ on tank 12, electrode J, conductor 102d leading to terminal $e$, internal conductor $C_2$ leading to grid $Gd$ of tube T, and ground $Gr_2$.

When the solenoid coil $C_1$ is energized it moves the solenoid core $C_8$ in such a manner as to keep the contacts 102 closed against the tension of a spring $Sp$, the contacts 102 having internal conductors $C_9$ and $C_{10}$ leading to the respective terminals $a$ and $b$ of the device $J_1$. Conductors 102b and 103 provide power from the main conductors 80 and 81 to the terminals $c$ and $d$ and thus to the primary transformer coil $C_{11}$.

When the solution level in tank 12 has dropped sufficiently to cause the electrode J to become sufficiently energized to change the bias on grid $Gd$ of tube T this will unbalance the tube T in a manner to de-energize the solenoid coil $C_1$ thereby allowing the contacts 102 to be opened by the spring $Sp$ and thus de-energize the switch coil 82 of relay switch $J_2$.

In Fig. 2a the electronic device $L_1$ controlled from the liquid level in solution tank 13 is identified by its terminals $f$, $g$, $h$, $i$, and $k$, an internal conductor 115b, a power supply conduit 115c connecting terminal $h$ with point 115d on main line 80, which together with line 116 between terminal $i$ and point 117 on main power line 81 supplies power to the electronic device $L_1$. A conductor 115e connects terminal $k$ with electrode L of tank 13, the tank being grounded as at $Gr_3$.

In Fig. 2b the electronic device $Q_1$ controlled from the liquid level in solution tank 14 is identified by its terminals $l$, $m$, $n$, $o$, and $p$, an internal conductor 130a, a power supply conduit 130b connecting terminal $n$ with point 130c on main power line 80, which together with line 131 between terminal $o$ and point 132 on main power line 81 supplies power to the electronic device $Q_1$.

A conductor 130d connects terminal $p$ with electrode Q of tank 14, the tank being grounded as at $Gr_4$. The character and operation of device $Q_1$ otherwise is the same as that of the device $J_1$ as detailed in Fig. 3 and described above.

Similarly a solenoid 105 of relay $L_2$ is energized to lift the contact member 106 so that the contact portion 107 will open the normally closed contacts 107a and 107b while closing the other three contact portions 108, 109, 110 will close the normally open contacts 108a and 108b, 109a and 109b, 110a and 110b. The relay $L_2$ is thus energized by a circuit starting at point 111, and comprising conductor 112 including solenoid coil 105, contact point 110a, conductor 113, point 91, conductors 92 and 94, normally closed switch $X_1$, conductors 96 and 98, point 99, contact point 110b, conductor 115, normally closed main contacts 115a of the electronic level control device $L_1$, an internal conductor 115b within the device $L_1$, and conductor 116 terminating at point 117 on line 81.

When energizing the relay $Q_2$ the solenoid 118 thereof will lift the contact member 119 so that the contact portions 120 and 121 open the normally closed contacts 120a and 120b as well as 121a and 121b, while the contact portions 122, 123, 124 close the normally open contacts 122a and 122b, 123a and 123b, 124a and 124b. The solenoid 118 is energized by a circuit starting at point 125, and comprising a conduit 126 including the solenoid coil 118, contact point 124a, conductor 127, point 93, conductor 94, normally closed switch $X_1$, conductor 96, point 97, conductor 128, contact point 124b, conductor 129, main contacts 130 of the electronic level control device $Q_1$, an internal conductor 130a within the device $Q_2$, and conductor 131 terminating at point 132 on line 81.

It will be noted that the normally closed relay switch $X_1$ serves merely to establish the energizing circuits for the relay switches $J_2$, $L_2$, $Q_2$, to cause the switch members to reset as just described, and to hold the circuit closed until all the relay switches have thus responded and have locked themselves in due to the closing of contact portion 87 on contact points 87a and 87b (for relay switch $J_2$), the closing of contact portion 110 on contact points 110a and 110b (for relay switch $L_2$), and the closing of contact portion 124 on contact points 124a and 124b (for relay switch $Q_2$). The re-setting done, the switch $X_1$ should open, to allow the relays $J_2$, $L_2$, $Q_2$ to operate in sequence, that is to drop one after another as controlled by the further automatic function of the system. To this end the normally open time delay switch S is energized by the closing of the line switch C, but will close only after a suitable lapse of time, say 15 seconds, within which time the relay switches $J_2$, $L_2$, $Q_2$ have had a chance to reset themselves. When at the end of this time interval the switch S closes it establishes an energizing circuit for solenoid coil 133 of switch $X_1$, which opens the switch and holds it open through the remainder of the automatic operation, that is to a point at the end of the current operation when again a re-setting of the relay switches $J_2$, $L_2$, $Q_2$ is required for a subsequent regeneration operation. It will be noted that the energizing circuit for the switch $X_1$ starts at point 134 on line 80 and comprises conductor 135, the closed switch S, conductor 136, point 137, conductor 138, point 139, main contacts 140 of timer switch X, point 141, conductor 142, solenoid coil 133, conductor 143 terminating at point 144 on line 81.

In parallel with the energizing circuit for the switch $X_1$ is a circuit running from point 137 through conductor 145 to point 146, through conductor 147, time clock 148, conductor 149, point 150, and conductor 151 terminating at point 152 on line 81 which starts the mechanism of time clock 148 and keeps it going until such time as the line switch C should again be opened. The timer switch has a clutch mechanism U which when electrically energized starts the pointer 153 of the clock. The clock has an adjustable stop or target 154 which when contacted by the pointer will cause the main contacts 140 to open thus breaking the energizing circuit through switch X, allowing the same to close and to cause re-setting of the relay switches J₂, L₂, Q₂ in the manner described above. The very re-setting of the relay Q₂ breaks the actuating circuit for the clutch device U thus allowing the timing pointer 153 to return to zero and thereby in turn to close the main contacts 140 of the timer switch to re-energize and open the switch X₁.

The energizing circuit for the switch S starts at point 155 on line 80 and comprises conductor 156, solenoid coil 157, conductor 158 terminating at point 159 on line 81.

Assuming now the relays J₂, L₂, Q₂ all having been properly re-set due to the delayed opening of switch X₁, the actual automatic sequential operation of the solution tanks 12, 13, 14 and of the bed-washing and wash water recovering steps will now be described.

To initiate this operation the start push button 159a of the push button device B is depressed to establish an energizing circuit for the starter switch A. The starter switch A has a solenoid coil 160 to actuate the switch member 161 which has three normally open contact portions 162, 163, 164 adapted to close corresponding contact points 162a and 162b, 163a and 163b, 164a and 164b of a power supply represented by three conductors 165, 166, 167 feeding the motor O which drives pump 48. The switch member 161 also has two normally open auxiliary contact portions 168 and 169 adapted to close corresponding contacts 168a, 168b, and 169a, 169b respectively.

Therefore, the momentary closing of the start push button 159a through solenoid action on the switch member 161 has a triple effect, namely, (a) to start the pump motor O; (b) to hold a solenoid circuit from point 170 through conductor 171, normally closed stop-push button contacts 159b, closed contact portion 168, solenoid holding coil 160, conductor 172, closed contact portion 122 of relay switch Q₂, conductor 173 terminating at point 174 on line 81; and (c) to energize solenoid unit H by establishing a circuit from point 175 through conductor 176, closed contact portion 169, conductor 177, solenoid coil 178, conductor 179, closed contact portion 86, conductor 180 terminating at point 181 on line 81.

This opens the outlet valve 52 of solution tank 12 so the pump 48 can start pumping twice used or weak regenerant solution from the tank 12 through valve 58 to the top of exchanger bed 10, displacing residual liquid from the bed through valve 40, gooseneck G₁, disposal outlet pipe 45 and valve 41 into header 39 to waste. The automatic carry-over operation to switch from tank 12 to tank 13 is effected when a lower limit level of the solution in tank 12 affects the electrode or probe J causing the electronic device J₁ to open the contacts 102, which de-energizes the solenoid 82 of relay switch J₂ releasing the switch member 83 thereof to open contacts 86a—86b de-energizing the solenoid coil 178 to allow the valve 52 to close. At the same time, the contact portion 84 (in relay switch J₂) closes the contact points 85a and 85b to establish an energizing circuit for the solenoid unit K to open the outlet valve 53 for tank 13 so the pump 48 can pump the contents of that tank (that is once-used or medium strong regenerant solution) to the exchanger bed 10. This energizing circuit is established from point 182 on line 80 through conductor 183, closed contacts 85a—85b, conductor 184, solenoid coil 185, conductor 186, closed contacts 109a—109b, conductor 187 terminating at point 188 on line 81. The solution being pumped from tank 13 to the top of bed 10 displaces from the bed residual spent solution through the valve 40, gooseneck G₁, disposal discharge pipe 45 and valve 41 to header 39 leading to waste.

Again, when due to the emptying of tank 13 a lower limit level therein reaches the electrode or probe L, this initiates the automatic carry-over from tank 13 to tank 14 by causing the contacts 115a to open and thereby to de-energize solenoid coil 105 of relay switch L₂. This releases the switch member 106 opening the contacts 110a, 110b, to open contacts 109a—109b de-energizing solenoid coil 185 of valve actuating unit K allowing valve 53 to close; closing contacts 107a—107b energizing solenoid coil 189 to open valve 54, and opening contacts 108a—108b de-energizing solenoid coil 190 of solenoid unit F closing the disposal discharge valve 41.

The energizing circuit for solenoid device M is established from point 191 on line 80, through conductor 192, contacts 107a—107b, conductor 193, solenoid coil 189, conductor 194, closed contacts 123a—123b, conductor 195 terminating at point 196.

Consequently, pump 48 starts pumping strong regenerant solution from tank 14 to the top of exchanger bed 10, displacing therefrom residual solution through valve 40 up through pipe sections 42, 43, 44 and then further up the distance h through gooseneck G₂ (the disposal discharge valve 41 now being closed due to the de-energization of solenoid coil 190) into the header 46 (herein also called the in-leading header) where the further flow is blocked by the gooseneck G₃ while the solution is being allowed to pass through the open valve 61 into tank 12 to serve as twice-used regenerant solution in a subsequent operating cycle. When tank 12 has thus been re-filled, an upper limit solution level therein raises the float 61a sufficiently to cause the inlet valve 61 for the tank to close.

As the tank 14 empties, a lower limit level therein will cause the electrode or probe Q to break contacts 130 of the electronic level control device Q₁ and thereby initiate another automatic carry-over operation namely that of sending rinse water through valve 76 to the top of exchanger bed 10 thereby displacing residual solution therefrom as once-used solution into tank 13 by way of the open valve 40, pipe sections 42, 43, 44, the upright gooseneck G₂, into the header 46 and on through the upright gooseneck G₃ then to be blocked by the upright gooseneck G₄ while flowing through the inlet valve 62 held open by the then lowered float 62a The circuit effecting this carry-over operation is established as the breaking of the contacts 130 de-energizes solenoid 118 of the relay switch Q₂, releasing the switch member 119 and also opening the contacts 124a—124b. This also opens contacts 123a—123b de-energizing solenoid 189 causing outlet valve 54 to close. This also opens contacts 122a—122b de-energizing the solenoid 160 of the power switch A causing the same to open. On the other hand, this closes the contacts 121a—121b energizing solenoid coil 197 of solenoid unit R opening the rinse water valve 36 which is associated with the timing switch mechanism X to admit wash water through pipe 20 (valve 24 being closed) to the top of the exchanger bed 10, displacing therefrom residual solution as once used solution into tank 13. That is to say, the closing of contacts 121a—121b establishes a circuit from point 198 on line 80 through conductor 199 contacts 121a—121b, conductor 200, switch contact Y₃, conductor 201, solenoid coil 197, conductor 202, switch contacts Y₄, and finally through conductors 203 and 117g to point 117h on line 81.

The release of switch member 119 also closes contacts 120a—120b making a circuit to energize the clutch device U to start pointer 153 of clock 148. This circuit is made from point 134 through the closed contacts of switch device S, conductor 136, point 137, conductor 145, point 146, through clutch device U, point 206, conductor 207, closed contacts 120a—120b, conductor 208, point 150, conductor 151 to point 152 on line 81.

The filling of tank 13 with once-used solution displaced from bed 10 by the rinse water will eventually raise the float 62a shutting the inlet valve 62 of the tank. Since the timer unit X has been set (by setting the target 154) to hold the rinse water valve open beyond this point, the water continuing to flow through the bed surges past the closed valve 63 through the upright gooseneck G₄ into tank 14. The water fills the tank until it raises float 63a closing inlet valve 63. The rinse water thus recovered in tank 14 contains a portion of substantially unspent regenerant solution or trailing solution as previously explained, and by the addition of regenerant chemical is then brought up to the strength required for fresh regenerant solution. Further excess water will then surge on through the gooseneck G₅ and out through pipe 64 to the waste disposal header 39.

When the pointer 153 of the timer clock 148 contacts the target 154, this will open the contacts 140 in the timer device breaking the energizing circuit for the switch X₁ permitting the switch to close and thereby to re-energize and re-set the relay switches J₂, L₂, Q₂. The re-setting of the switch Q₂ in turn breaks the circuit through the clutch device U, which frees the pointer 153 allowing it to return to zero in the timer clock 148.

The internal functioning of the timer switch X appears more clearly in Fig. 4 showing in particular the mechanical interconnection and operating relationship between the clutch device U, the contacts 140, and the timer clock 148.

The timer clock 148 comprises a Telechron- or electric clock motor 209 which runs continuously at a uniform rate, the motor 209 drawing its power through conductors 210 and 211 respectively from terminals 146 and 150, the terminal 146 being connected by way of conductor 145, point 137, conductor 136, closed switch S, conductor 135, with point 134 on main line 80, the terminal 150 being connected by way of conductor 151 with point 152 on main line 81.

The clutch device U comprises an electromagnet 212 and an armature 213 in the form of a bell crank lever 214 pivotally mounted as at 215, the horizontal arm 213a of the lever being under the control of the electromagnet while the vertical arm 213b by means of a bifurcated end portion 213c engages and operates a clutch 216 the purpose and function of which will be explained further below. The electromagnet when energized attracts the horizontal arm 213a of the armature against the tension of a spring 213d causing the vertical arm 213b to engage the clutch 216. When the magnet is de-energized, the spring 213d acting upon arm 213b disengages the clutch. The electromagnet 212 is energized through conductor 217 and 218 from terminals 146 and 206 respectively, the terminal 146 being connected by way of conductor 145, point 137, conductor 136, closed contacts of switch S, conductor 135 with point 134 on main line 80, the terminal 206 being connected by way of conductor 207, closed contacts 120a and 120b of relay switch Q₂, conductor 208, and conductor 151 with point 152 on main line 81.

The contacts 140 are connected through conductors 219 and 220 with terminals 139 and 141 respectively, the terminal 139 in turn being connected through conductor 138, point 137, conductor 136, the normally closed contacts of switch S and conductor 135 with point 134 on line 80, while terminal 141 connects through conductor 142, solenoid coil 133 of switch X₁, and conductor 143 with point 144 on main line 81.

The clock motor 148 has a drive pinion 221 meshing with a gear 222 fixed on shaft 223 which is co-axial with a shaft 224, the shafts having potential driving engagement with one another by way of the clutch 216. The free end of shaft 224 has fixed thereon a pinion 225 meshing with gear 226 fixed on one end of a shaft 227 while the opposite end thereof has fixed thereon the pointer 153 shown in zero position although movable over an arcuate scale member 228.

The target arm 230 has a bent over pointed extreme end portion 230a for adjustment relative to the numerals provided on the scale member 228 and representing the time intervals to which the opening of the contacts 140 can be adjusted by the angular adjustment of the target arm 230.

When the electromagnet 212 is energized and the clutch 216 accordingly engaged to transmit driving power from shaft 223 to shaft 224, the Telechron motor 148 will rotate the pointer 153 towards the target arm 230 by way of rotating the shafts 223, 224, and 227, such rotation being effected against the tension of a spiral spring 233 acting upon shaft 224. When the pointer 153 reaches the target arm 230, the finger 229 will open the contacts 140 thereby de-energizing the electromagnet 212 and thus releasing the armature 213 and allowing spring 213d to disengage clutch 216. This disconnects the driving power of the Telechron motor 148 from shaft 224 and allows the spiral spring 233 to return the pointer 153 to its zero position at the end of the scale member 228.

An example of the construction of any one of the electrode fittings J, L, Q, is presented in Fig. 5. An electrode proper 300 having a horizontal portion 300a and a vertical downwardly bent portion 300b is tightly mounted in an insulating sleeve 301 which in turn has a tight fit in a nipple 302 screwed tightly into a reinforced portion of the wall of a solution tank, the reinforcement being shown to consist of a flange 303 welded to the tank. Screwed tightly upon the nipple 302 is a T-pipe fitting 304 being closed by a plug or screw cap 305. The lateral branch 306 of the pipe fitting has screwed into it a tubular member 307 protectively surrounding an electric conduit 308 fastened as at 309 to the outer terminal of the electrode 300. The electric conduit 308 corresponds for example to the conduit 102d leading from tank 12 to terminal e of switch unit J₁.

This concludes the automatic procedure of regeneration, and it can be re-started by again pushing the start push button 159a, for instance after switching the regeneration system including the tank 12, 13, 14 to the other exchanger bed 11.

If it is proposed to treat a water for complete ionic purification or de-salting, the water can be subjected sequentially to treatment in a cation exchanger bed and an anion exchanger bed. As a net result of this treatment, the ionized solutes in the water are replaced with the molar equivalent of pure water.

In conditioning some raw waters the problem is to reduce hardness and alkalinity by reducing the molar concentration of carbonates and/or bi-carbonates irrespective of the presence of non-carbonates. This can be effected by treating a proportion of the raw water supply with H-ion exchanger and mixing the resulting acidified effluent water from the exchanger bed with a suitable proportion of the untreated or raw water sufficient to neutralize the acidity. Such mixing of acidified water with untreated water to effect neutralization has been disclosed in the patent to Vaughan, No. 2,190,853.

A certain proportion of this supply of raw water is subjected to cation exchange treatment that operates in the H-ion exchange cycle, whereby the basic cations of the solutes are taken up by the exchanger material, while the molar equivalent in H-ion is released from the exchanger material into the solution. By thus replacing the cations of the non-carbonate portion of the solutes with H-ion, strong-acid is formed. In respect to the carbonate- or bi-carbonate portion of the solutes, the exchange reaction will merely result in the formation or freeing of $CO_2$ and/or of carbonic acid as the case may be.

A lowering of the pH as evident in the effluent water coming from the exchanger bed, is essentially due to the strong-acid component induced by this exchange operation, rather than due to the $CO_2$ and/or the carbonic acid component. Thereafter, the untreated balance of the raw water supply is then utilized to effect neutralization of the strong-acid component in the acid effluent water, by mixing. That is to say, the carbonate and/or bi-carbonate content of the raw water portion being admixed to, or blended in with the treated and acidified portion of the water, reacts with the free acid, which reaction results in the formation of additional $CO_2$ and/or carbonic acid. The mixture having thus been substantially neutralized, may subsequently be subjected to treatment, such as aeration, for effecting or hastening the removal from the mixture of $CO_2$ and/or carbonic acid.

We claim:

1. In combination with a container holding a bed of exchanger material and having a valve-controlled inlet for liquid to be passed through the bed for treatment, a valve-controlled outlet for treated liquid, influent means for regenerant solution to be passed through the bed, effluent means for the solution and a control valve therefor, a rinse water supply conduit and a control valve therefor, a system for regenerating the bed comprising a first tank for fresh regenerant solution, a second tank for first-used solution, a third tank for twice-used regenerant solution, a feed conduit leading from said solution effluent means of the container to said tanks and having an inlet for each tank for passing effluent liquid thereto from said bed under a pressure head and an inlet control valve for each tank inlet adapted to be opened and closed while the flow cross-section of the conduit remains unobstructed, said feed conduit also having a disposal connection provided with a disposal valve disposed between the solution effluent means and the third tank, a discharge conduit leading from the solution tanks to said solution influent means of the container and having an outlet for each tank and an outlet control valve for each tank outlet, and a control system to effect the sequential drainage operation of said solution tanks as well as the operation of said rinse water supply with respect to the bed by way of said conduits comprising a pump in circuit with said tanks as well as said bed and said feed and discharge conduits for maintaining said operation, power drive means for the pump, relay-controlled power means for actuating the third tank outlet valve, relay-controlled power means for actuating the second tank outlet valve, a relay device associated with the third tank and adapted to initiate actuating impulses to said third and said second tank outlet valve power means when the third tank has substantially drained empty, control impulse transmitting means whereby said third tank relay device sends impulses to close the third tank outlet valve and to open the second tank outlet valve to allow first-used solution to pass to and through the bed displacing residual liquid therefrom through said disposal connection, relay-controlled power means for actuating the first tank outlet valve, relay-controlled power means for actuating the disposal valve, a relay device associated with the second tank and adapted to initiate actuating impulses to both said first tank outlet valve and said disposal valve power means when the second tank has substantially drained empty, control impulse transmitting means whereby said last-mentioned relay device sends impulses to close the second tank outlet valve as well as to close the disposal valve and to open the first tank outlet valve to allow fresh solution to pass therefrom to and through the bed by displacing residual solution from the bed through the third tank inlet valve into the third tank, said feed conduit comprising a vented rising portion interposed between said disposal valve and the third tank inlet and sufficiently high to prevent flow of liquid therethrough while the disposal valve is open but insufficiently high to prevent said pressure head from forcing bed effluent liquid up through and past said rising portion for delivery into the third tank when the third tank inlet valve is open and the disposal valve is closed.

2. A regeneration system according to claim 1, with the addition of a relay device associated with the first tank and adapted to initiate actuating impulses from the relay device to the power means of the first tank outlet valve, and control impulse transmitting means to close said outlet valve when the first tank has substantially drained empty.

3. A regeneration system according to claim 1, with the addition of a relay device associated with the first tank adapted to initiate actuating impulses to the power means of the first tank outlet valve, relay-controlled power means for the rinse water control valve, control impulse transmitting means whereby said relay device sends impulses for closing said first tank outlet valve as well as for opening the rinse water supply valve to the bed when the first tank has substantially drained empty whereby residual solution is displaced by the rinse water from the bed through said feed conduit to and through the second tank inlet valve and into the second tank, said feed conduit comprising a second vented rising portion interposed between the third tank inlet and the second tank inlet and sufficiently high to prevent flow of liquid therethrough while the second tank inlet valve is open but insufficiently high to prevent said pressure head to force bed effluent liquid up through and past said rising portion for delivery into the second tank when the second tank inlet valve is open and the third tank inlet valve is closed, and actuating means associated with the third tank inlet valve and responsive to the liquid level in the third tank to close the third tank inlet valve when the level reaches a predetermined elevation.

4. A regeneration system according to claim 1, with the addition of a relay device associated with the first tank adapted to initiate actuating impulses to the power means of the first tank outlet valve, relay-controlled power means for the rinse water control valve, control impulse transmitting means whereby said relay device sends impulses for closing said first tank outlet valve as well as for opening the rinse water supply valve to the bed when the first tank has substantially drained empty whereby residual solution is displaced by the rinse water from the bed through said feed conduit to and through the second tank inlet valve and into the second tank, said feed conduit comprising a second vented rising portion interposed between the third tank inlet and the second tank inlet and sufficiently high to prevent flow of liquid therethrough while the second tank inlet valve is open but insufficiently high to prevent said pressure head from forcing bed effluent liquid up through and past said rising portion for delivery into the second tank when the second tank inlet valve is open and the third tank inlet valve is closed, actuating means associated with the third tank inlet valve and responsive to the liquid level in the third tank to close the third tank inlet valve when the level reaches a predetermined elevation, and said feed conduit comprising a third vented rising portion interposed between the second tank inlet and the first tank inlet and sufficiently high to prevent flow of liquid therethrough while the second tank inlet valve is open but insufficiently high to prevent said pressure head from forcing rinse water bed effluent containing a quantity of trailing regenerant solution up through and past said rising portion for delivery into the first tank when the first tank inlet valve is open and the second tank inlet valve is closed, and actuating means associated with the second tank inlet valve and responsive to the liquid level in the second tank to close its inlet valve when the level reaches a predetermined elevation.

5. A regeneration system according to claim 1, in which said pump is disposed in said discharge conduit, and with the addition of a relay device associated with the first tank adapted to initiate actuating impulses to the power means of the first tank outlet valve, relay-controlled power means for the rinse water control valve, control impulse transmitting means whereby said relay device sends impulses for closing said first tank outlet valve for stopping the power drive means for said pump as well as for opening the rinse water supply valve to the bed when the first tank has substantially drained empty whereby residual solution is displaced by the rinse water from the bed through said feed conduit to and through the second tank inlet valve and into the second tank, said feed conduit comprising a second vented rising portion interposed between the third tank inlet and the second tank inlet and sufficiently high to prevent flow of liquid therethrough while the disposal valve is open but insufficiently high to prevent said pressure head from forcing bed effluent liquid up through and past said rising portion for delivery into the second tank when the second tank inlet valve is open and the third tank inlet valve is closed, and actuating means associated with the third tank inlet valve and responsive to the liquid level in the third tank to close the third tank inlet valve when the level reaches a predetermined elevation.

6. A regeneration system according to claim 1, with the addition of a relay device associated with the first tank adapted to initiate actuating impulses to the power means of the first tank outlet valve, relay-controlled power means for the rinse water control valve, control impulse transmitting means whereby said relay device sends impulses for closing said first tank outlet valve as well as for opening the rinse water supply valve to the bed when the first tank has substantially drained empty whereby residual solution is displaced by the rinse water from the bed through said feed conduit to and through the second tank inlet valve and into the second tank, said feed conduit comprising a second vented rising portion interposed between the third tank inlet and the second tank inlet and sufficiently high to prevent flow of liquid therethrough while the second tank inlet valve is open but insufficiently high to prevent said pressure head from forcing bed effluent liquid up through and past said rising portion for delivery into the second tank when the second tank inlet valve is open and the third tank inlet valve is closed, actuating means associated with the third tank inlet valve and responsive to the liquid level in the third tank to close the third tank inlet valve when the level reaches a predetermined elevation, said feed conduit comprising a third vented rising portion interposed between the second tank inlet and the first tank inlet and sufficiently high to prevent flow of liquid therethrough while the second tank inlet valve is open but insufficiently high to prevent said pressure head from forcing rinse water bed effluent containing a quantity of trailing regenerant solution up through and past said rising portion for delivery into the first tank when the first tank inlet valve is open and the second tank inlet valve is closed, actuating means associated with the second tank inlet valve and responsive to the liquid level in the second tank to close its inlet valve when the level reaches a predetermined elevation, said feed conduit means comprising a fourth vented rising portion disposed past the first tank inlet and sufficiently high to prevent flow of liquid therethrough while the first tank inlet valve is open but insufficiently high to prevent said pressure head from forcing rinse water bed effluent up through and past said rising portion when the first tank inlet valve is closed, and actuating means associated with the first tank inlet valve and responsive to the liquid level in the first tank to close its inlet valve when the level reaches a predetermined elevation.

7. A regeneration system according to claim 1, with the addition of a relay device associated with the first tank adapted to initiate actuating impulses to the power means of the first tank outlet valve, relay-controlled power means for the rinse water control valve, control impulse transmitting means whereby said relay device sends impulses for closing said first tank outlet valve as well as for opening the rinse water supply valve to the bed when the first tank has substantially drained empty whereby residual solution is displaced by the rinse water from the bed through said feed conduit to and through the second tank inlet valve and into the second tank, said feed conduit comprising a second vented rising portion interposed between the third tank inlet and the second tank inlet and sufficiently high to prevent flow of liquid therethrough while the second tank inlet valve is open but insufficiently high to prevent said pressure head from forcing bed effluent liquid up through and past said rising portion for delivery into the second tank when the second tank inlet valve is open and the third tank inlet valve is closed, actuating means associated with the third tank inlet valve and responsive to the liquid level in the third tank to close the third tank inlet valve when the level reaches a predetermined elevation, said feed conduit comprising a third vented rising portion interposed between the second tank inlet and the first tank inlet and sufficiently high to prevent flow of liquid therethrough while the second tank inlet valve is open but insufficiently high to prevent said pressure head from forcing rinse water bed effluent containing a quantity of trailing regenerant solution up through and past said rising portion for delivery into the first tank when the first tank inlet valve is open and the second tank inlet valve is closed, actuating means associated with the second tank inlet valve and responsive to the liquid level in the second tank to close its inlet valve when the level reaches a predetermined elevation, said feed conduit means comprising a fourth vented rising portion disposed past the first tank inlet and sufficiently high to prevent flow of liquid therethrough while the first tank inlet valve is open but insufficiently high to prevent said pressure head from forcing rinse water bed effluent up through and past said rising portion when the first tank inlet valve is closed, actuating means associated with the first tank inlet valve and responsive to the liquid level in the first tank to close its inlet valve when the level reaches a predetermined elevation, and actuating means controlled by substantially predetermined rinse water volume to close the rinse water control valve and to open the bed effluent disposal valve.

8. In combination with a container holding a bed of exchanger material and having a valve-controlled inlet for liquid to be passed through the bed for treatment, a valve-controlled outlet for treated liquid, influent means for regenerant solution to be passed through the bed, effluent means for the solution and a control valve therefor, a rinse water supply conduit and a control valve therefor, a system for regenerating the bed comprising a first tank for relatively strong regenerant solution, a second tank for relatively weaker regenerant solution, a feed conduit leading from said solution effluent means of the container to said tanks and provided with an inlet for each tank for passing effluent liquid thereto from said bed under a pressure head as well as a control valve for each tank inlet adapted to be opened and closed while the flow cross-section of the conduit remains unobstructed, said feed conduit also having a disposal connection between the solution effluent means and the second tank and provided with a disposal valve, a discharge conduit leading from the solution tanks to said solution influent means of the container and providing an outlet for each tank and a control valve for each tank outlet, and a control system to effect the sequential drainage operation of said solution tanks as well as the operation of said rinse water supply with respect to the bed by way of said conduits comprising a pump in circuit with said tanks as well as with said bed and with said conduits for maintaining said operation, power drive means for the pump, relay-controlled power means for actuating the second tank outlet valve, relay-controlled power means for actuating the first tank outlet valve, a relay device associated with the second tank adapted to initiate actuating impulses to both said first and second tank outlet valves when the second tank has substantially drained empty displacing liquid from the bed through said disposal valve, control impulse transmitting means whereby said relay device sends impulses to close the second tank outlet valve as well as to open the first tank outlet valve to allow fresh solution to pass therefrom to and through the bed displacing residual solution through said disposal valve, a relay device associated with the first tank adapted to initiate actuating impulses to the power means of the first tank outlet valve, relay-controlled power means for the rinse water control valve, control impulse transmitting means whereby said relay device sends impulses for closing said first tank outlet valve as well as for opening the rinse water supply valve to the bed when the first tank has substantially drained empty whereby residual solution is displaced by the rinse water from the bed through said feed conduit to and through the second tank inlet valve into the second tank when said disposal valve is closed, said feed conduit comprising a vented rising portion interposed between the second and the first tank inlet valve and sufficiently high to prevent flow of liquid therethrough while the second tank inlet valve is open but insufficiently high to prevent said pressure head from forcing bed effluent liquid containing a quantity of trailing regenerant solution up through and past said rising portion for delivery into the first tank when the first tank inlet valve is open while the second tank inlet valve is closed, and actuating means associated with the second tank inlet valve responsive to the liquid level in the second tank to close the second tank inlet valve when the level reaches a predetermined elevation.

9. A regeneration system according to claim 8, with the addition that said feed conduit comprises a second vented rising portion disposed past the first tank inlet and sufficiently high to prevent flow of liquid therethrough while the first tank inlet valve is open but insufficiently high to prevent said pressure head from forcing rinse water bed effluent up through and past said rising portion when the first tank inlet valve is closed, and actuating means associated with the first tank inlet valve and responsive to the liquid level in the first tank to close its inlet valve when the level reaches a predetermined elevation.

10. A regeneration system according to claim 8, with the addition of actuating means controlled by a substantially predetermined rinse water volume to close the rinse water control valve.

11. A regeneration system according to claim 8, with the addition of actuating means controlled by a substantially predetermined rinse water volume to close the rinse water control valve and to open the bed effluent disposal valve.

12. In combination with a container holding a bed of exchanger material and having a valve-controlled inlet for liquid to be passed through the bed treatment, a valve-controlled outlet for treated liquid, influent means for regenerant solution to be passed through the bed, effluent means for the solution and a control valve therefor, a rinse water supply conduit and a control valve therefor, a tank for regenerant solution, a feed conduit leading from said solution effluent means of the container to said tank, an inlet for the tank for passing effluent liquid thereto from said bed under a pressure head, a control valve for said tank inlet adapted to be opened and closed while the flow cross-section of the conduit remains unobstructed, said feed conduit also having a disposal connection provided with a disposal valve disposed between the solution effluent means and the tank, a discharge conduit leading from the solution tank to said solution influent means of the container and provided with an outlet for said tank and a control valve for the outlet, a control system to effect sequentially the drainage of said tank into said bed and the operation of the rinse water supply with respect to the bed comprising a pump in said discharge conduit and power drive means therefor, relay-controlled power means for actuating the tank outlet valve, relay-controlled power means for actuating the rinse water control valve, a relay device associated with the tank and adapted to initiate actuating impulses to said outlet valve power means when the tank has substantially drained empty displacing liquid through said disposal valve, control impulse transmitting means whereby said relay device sends impulses to close the tank outlet valve to stop the pump while opening the rinse water control valve whereby rinse water displaces residual solution from the bed first through said disposal valve while the same is open and then when that valve is closed displaces rinse water containing trailing regenerant solution into said tank, said feed conduit comprising a rising portion disposed past the tank inlet valve and sufficiently high to prevent flow of liquid therethrough while the tank inlet valve is open but insufficiently high to prevent said pressure head from forcing bed effluent liquid up through and past said rising portion when said inlet valve is closed.

13. A regeneration system according to claim 12, with the addition of actuating means controlled by a substantially predetermined rinse water volume to close the rinse water control valve.

14. A regeneration system according to claim 12, with the addition of actuating means controlled by a substantially predetermined rinse water volume to close the rinse water control valve and to open the discharge disposal valve.

PETER M. CONTANT.
ANTHONY J. FISCHER.
WAYNE A. KIVELL.

REFERENCES CITED

The following references are of record in the file of this patent:

UNITED STATES PATENTS

| Number | Name | Date |
| --- | --- | --- |
| 2,003,757 | Pick | June 4, 1935 |
| 1,949,044 | Dotterweich | Feb. 27, 1934 |
| 2,065,962 | Bowers | Dec. 29, 1936 |
| 2,217,822 | Symons | Oct. 15, 1940 |
| 2,287,284 | Behrman | June 23, 1942 |
| 2,145,820 | Tucker | Jan. 31, 1939 |
| 2,182,415 | Thigpen | Dec. 5, 1939 |
| 1,255,359 | Uecke | Feb. 5, 1918 |